Feb. 14, 1928.
F. SMUTEK
1,659,448
HANDSAW
Filed March 26, 1926
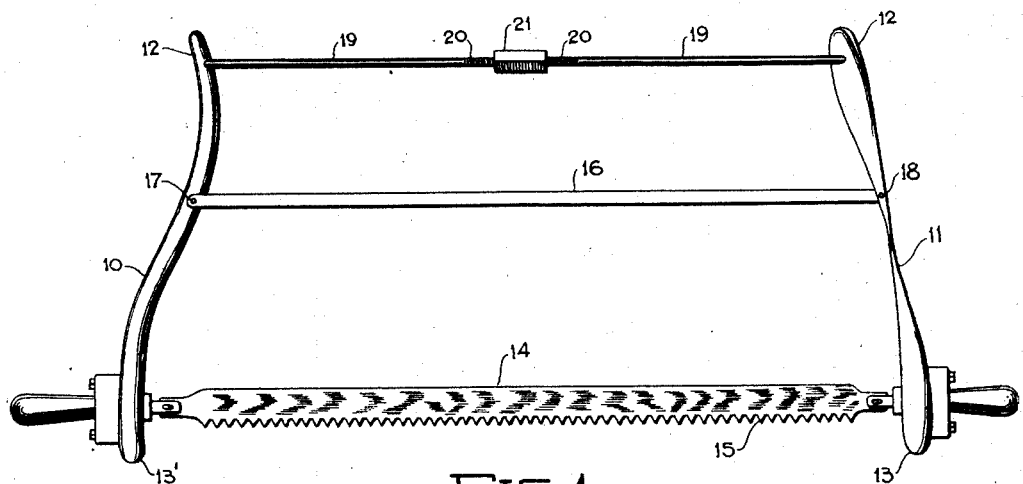
FIG.1
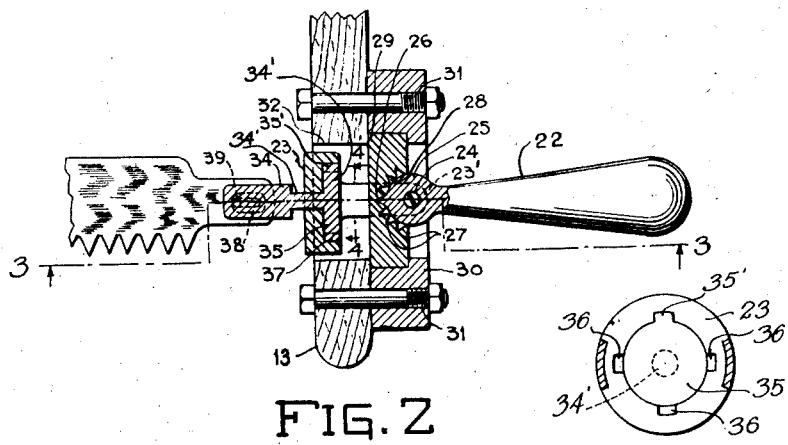
FIG.2
FIG.4
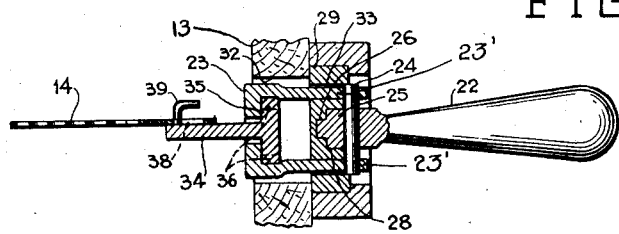
FIG.3
INVENTOR
Frank Smutek
BY
ATTORNEY Patented Feb. 14, 1928.

1,659,448

UNITED STATES PATENT OFFICE.

FRANK SMUTEK, OF ANGOLA, NEW YORK.

HANDSAW.

Application filed March 26, 1926. Serial No. 97,545.

This invention relates generally to hand saws used for sawing wood, and the like, the invention having more particular reference to a novel type of hand saw.

The invention has for an object the provision of an improved hand saw embodying a means of holding the saw blade at any desired angle relative to the saw frame.

A further object of the invention is the provision of an improved hand saw embodying a means of holding the handle at any desired angle relative to the saw frame.

For further comprehension of the invention, and of the objects and advantages thereof, reference will be had to the following description and accompanying drawing, and to the appended claims in which the various novel features of the invention are more particularly set forth.

Fig. 1, of the drawing, is a side elevational view of my improved hand saw.

Fig. 2, is an enlarged fragmentary vertical central sectional view illustrating the means of holding the saw blade and the handle at any desired angle relative to the saw frame.

Fig. 3 is a similar horizontal central sectional view thereof taken on the line 3—3 of Figure 2.

Fig. 4 is a sectional view taken on the line 4—4 of Figure 2.

As here embodied my improved hand saw comprises frames 10 and 11, provided with upper elements 12, suitably formed or curved, as handles, and having lower elements 13 and 13', provided with a means of holding a saw blade 14, as will be hereinafter more fully described and set forth, and preferably having teeth 15 formed with similar and even angular edges. The frames 10 and 11, are pivotally attached to each other by a cross member 16, as at 17 and 18, respectively, and have attached at their upper elements 12, flexible members 19, preferably threaded as at 20, and provided with a turn buckle 21, as a means of tightening the said saw blade 14.

Referring in particular to Figs. 2 and 3, of the accompanying drawing, the handle 22 is pivotally attached to the extended arms 23' of the holder 23, as at 24, by a pin, or any suitable similar means, and is provided with a cylindrical head 25, concentric to the pin 24, and having an extended element 26, preferably pointed, or suitably shaped to engage, any desired one of the similar shaped apertures 27 provided in the recess 28 of the block 29, the said recess 28 being suitably shaped to accommodate the cylindrical head 25 of the handle 22. The block 29, preferably cylindrically shaped, is rotatively mounted in the support 30, which is rigidly attached to the lower elements 13 of the frames 10 and 11, by bolts 31, screws, or any similar suitable means. These bolts when drawn up very tightly clamp the block 29 between members 30 and 13, thus frictionally holding the block against rotation. It being understood that the lower elements 13, are provided with suitable apertures 32, to accommodate the holder 23, and that the block 29, is also provided with suitable apertures 33, to accommodate the arms 23' of the holder 23, The saw blade holder 34 is provided with an enlarged head 35, preferably cylindrical shaped and having an extended portion 35', at its periphery, adapted to engage any desired one of the similar shaped apertures 36 or notches extending from the recess 37, to accommodate the enlarged head 35 of the saw blade holder 34. The saw blade 14, is removably attached at its extremities to the saw blade holders 34, by means of an elongated slot 38, adapted to engage a hooked shaped projecting element 39, rigidly attached to the saw blade holder 34, or by any suitable similar means.

In the above described construction, the handle 22 may be rotated about its axis for the purpose of positioning it at any desired convenient angular position with the end member 26 reclining in any one of the notches 27. This latter adjustment may be made by loosening the turnbuckle 21; it should be understood that the handle 22 may also be positioned out of the plane of the frame members 10 and 11 by rotation of the block 29 upon the loosening of bolts 31. When the handle 22 is inclined to the blade 14, the saw may be manipulated by grasping the handle; it should be understood that draw strokes are more conveniently effected with the handle in an inclined position.

The angle of the blade 14 relative to the plane of the frames 10 and 11 may be varied by rotation of the blade holder 34 relative to the block 29 and the handle 22, thus permitting the handle 22 to be retained in any desired angular position relative to the blade 14. A neck 34' of circular cross section, is provided on the blade holder 34 to permit rotation thereof. In order to effect this adjustment the turnbuckle 21 must be loosened to permit inward movement of the lower ends of the frames 10 and 11 thereby causing the extension 35' of the head 35 to be disengaged from one of the recesses 36 and placed in another similar recess at a different position. By means of a similar adjustment the blade holder may be retained fixed while the block and handle are rotated to a different position thus making it possible to retain the handle at any desired angular position relative to the blade 14.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention what I claim as new and desire to protect by Letters Patent of the United States is as follows:—

1. A hand saw comprising spaced end members, a block rotatively mounted on said spaced end members, a socket member comprising extensions disposed through apertures in said block, a handle pivotally mounted on said extensions, a blade holder comprising a head disposed in said socket member, said blade holder being rotatable relative to said socket member, and extensions on the head portion of said blade holder, engageable in notches in said socket member, the extensions of said blade holder being disengageable from said notches to allow the blade to be adjusted to any of the positions indicated by the location of the notches.

2. A hand saw comprising spaced end members, an adjustable cross member joining the upper ends of said end members, a rigid cross member pivotally attached at its ends to said end members intermediate the extremities thereof, blocks rotatively mounted on the lower ends of said end members, a blade disposed between the extremities of said end members, detachable blade holders secured to the ends of said blade and provided with enlarged extremities, socket members having extensions at one of their ends disposed through slots in said blocks, means on the ends of the blade holders and socket members for adjustably holding said blade holders in a desired position, said blade holders being rotatively mounted in said socket members for permitting said blade to be disposed at different angular relations to the plane of said end members, and a handle journaled on said extensions of the socket members, and adapted to be rotated relative thereto and to be rotated in unison with said socket for positioning said handle at any desired angle relative to said end members.

In testimony whereof I have affixed my signature.

FRANK SMUTEK.